US012652420B2

(12) United States Patent
Vounckx et al.

(10) Patent No.: US 12,652,420 B2
(45) Date of Patent: Jun. 9, 2026

(54) BUFFER MANAGEMENT FOR LIVE VIDEO STREAMING

(71) Applicant: Dolby International AB, Dublin (IE)

(72) Inventors: Johan Vounckx, Linden (BE);
Pieter-Jan Speelmans, Diest (BE)

(73) Assignee: DOLBY INTERNATIONAL AB,
Dublin (IE)

( * ) Notice: Subject to any disclaimer, the term of this patent is extended or adjusted under 35 U.S.C. 154(b) by 41 days.

(21) Appl. No.: 18/565,601

(22) PCT Filed: May 17, 2022

(86) PCT No.: PCT/EP2022/063235
§ 371 (c)(1),
(2) Date: Nov. 30, 2023

(87) PCT Pub. No.: WO2022/253561
PCT Pub. Date: Dec. 8, 2022

(65) Prior Publication Data
US 2024/0259612 A1    Aug. 1, 2024

(30) Foreign Application Priority Data
May 31, 2021    (EP) .................................... 21176825

(51) Int. Cl.
H04N 21/2187      (2011.01)
H04N 21/44      (2011.01)
(52) U.S. Cl.
CPC ... H04N 21/2187 (2013.01); H04N 21/44004 (2013.01)

(58) Field of Classification Search
CPC .................... H04N 21/2187; H04N 21/44004
See application file for complete search history.

(56) References Cited

U.S. PATENT DOCUMENTS

| | | | |
|---|---|---|---|
| 2008/0205856 A1 | 8/2008 | Kim et al. | |
| 2015/0032851 A1* | 1/2015 | Lieber ................... | H04L 65/762 |
| | | | 709/219 |
| 2015/0146689 A1* | 5/2015 | Fu ......................... | H04J 3/0632 |
| | | | 370/331 |
| 2016/0036880 A1* | 2/2016 | Frett ....................... | H04L 43/16 |
| | | | 709/224 |

FOREIGN PATENT DOCUMENTS

EP          3515075 A1      7/2019

OTHER PUBLICATIONS

Extended European Search Report from corresponding EP Application No. 21176825.4, Dec. 23, 2021.
International Search Report from corresponding PCT Application No. PCT/EP2022/063235, Aug. 26, 2022.
(Continued)

*Primary Examiner* — Nnenna N Ekpo

(57) ABSTRACT

A method is disclosed for playing a live stream in a media player that includes a playback buffer for buffering received video packets according to a target buffer size. The method comprises measuring time fluctuations in arrival of the received video packets in the playback buffer, and adjusting the target buffer size based on the measured time fluctuations.

12 Claims, 6 Drawing Sheets

(56) References Cited

OTHER PUBLICATIONS

Tu W et al.: "APB: An Adaptive Playback Buffer Scheme for Wireless Streaming Media", IEICE Transaction on Communication, Communications Society, vol. E88-B, No. 10, Oct. 1, 2005, pp. 4030-4039.

Mingfu Li et al. "Arrival process-controlled adaptive media playout with multiple thresholds for video streaming". Multimedia Systems, Springer, vol. 18, No. 5, Apr. 26, 2012, pp. 391-407.

[No Author Listed], "Information technology—Dynamic adaptive streaming over HTTP (DASH)—Part 1: Media presentation description and segment formats," ISO/IEC 23009-1:2012, ISO/IEC JTC 1/SC 29/WG 11, 2012, 133 pages.

Fielding et al., "Hypertext Transfer Protocol (HTTP/1.1): Range Requests," Internet Engineering Task Force (IETF), RFC: 7233, Jun. 2014, 25 pages.

\* cited by examiner

BUFFER MANAGEMENT FOR LIVE VIDEO STREAMING

TECHNICAL FIELD

Various example embodiments relate to buffer management for live streaming.

BACKGROUND

Video streaming is immensely popular nowadays. It allows viewers to start watching video content without the need to completely download the content beforehand. A large portion of the Internet traffic consists of such video streamed from video services to clients, typically from a content distribution network, a CDN, to a video player application running on a PC, a tablet, a smartphone, a set-up box, a TV etc. In video streaming, the video is further delivered on demand or on request of the client. From a technology point of view, this differentiates video streaming as a request- or pull-based unicast technology from traditional broadcasting technology which is a push-based technology.

Live video streaming is a form of video streaming wherein the client retrieves the video content while it comes available for streaming. This is typically used for streaming live footage or when a content provider releases content from a certain point in time onwards.

One available streaming technology that supports live streaming is chunked or segmented streaming. The media is then divided in smaller video packets that are referred to as chunks or segments which are downloaded and played by the client one after the other. Such protocols may also offer adaptive bitrate streaming allowing the client to switch between different bit rates, resolutions or codecs depending on the available resources. To achieve this, different versions of the streams, each with a different bit rate, resolution or codec, are made available. Information on the different representations and their segmenting is then available by means of a manifest file that is updated regularly. Examples of such streaming protocols are HTTP Adaptive Streaming, HAS, protocols are MPEG-DASH published as ISO/IEC 23009-1:2012, HTTP Dynamic Streaming by Adobe, HTTP Live Streaming (HLS) by Apple and Smooth Streaming, a Microsoft IIS Media Services extension.

To initiate the playback of a live stream, the client may identify the most recent segment or chunk from the manifest file and start the live stream from that segment or chunk onwards.

Another available streaming technology is disclosed in EP3515075A1 wherein a video stream is made available in an independent version and one or more dependent versions. The independent version then provides a stream of temporal independent video packets each having one or a few video frames. Such an independent video packet is decodable on its own, i.e. has no temporal dependencies on other video packets. A dependent version then provides a compressed stream that can have either dependent or independent video packets. When starting a video stream the client first retrieves, by a first request, a first video packet from the independent version to build up the image in the video player and then retrieves the subsequent video packets by a second request from an available dependent version. To initiate the playback of a live stream with this streaming technology, the client can start the playback at the most recent independent video packet and then continue with the subsequent video packets. Due to its small size of one or a few frames, a very short delay between showtime, i.e. the time when a frame becomes available, and playtime, i.e. when the frame is displayed to the viewer, can be achieved. To identify the most recent video packets in the live stream, a manifest file can be provided that contains information on the different versions and identifies the independent and dependent video packets.

A media player typically contains a playback buffer where video packets and thus video frames are temporarily stored between reception and playback. Such buffer allows continuing the playback when the delivery of video packets is disrupted either caused by the player or external factors. However, such buffer causes both an increase in playback delay and in showtime delay. The playback delay is a first performance metric that is indicative for the delay between a request to play the live stream and the actual playback of the live stream. The showtime delay is a second performance metric in live streaming that is indicative for the delay between the moment that the most recent video packet is made available on the CDN and the moment that it is displayed to the viewer.

SUMMARY

The scope of protection sought for various embodiments of the invention is set out by the independent claims.

The embodiments and features described in this specification that do not fall within the scope of the independent claims, if any, are to be interpreted as examples useful for understanding various embodiments of the invention.

Amongst others, it is an object of embodiments of the invention to alleviate the above identified problems and to provide in a solution that provides improved live streaming.

According to a first example aspect, the disclosure relates to a method for playing a live stream in a media player; the media player comprising a playback buffer for buffering received video packets according to a target buffer size; the method comprising measuring time fluctuations in arrival of the received video packets in the playback buffer and adjusting the target buffer size based on the measured time fluctuations.

In other words, the media player foresees in an adjustable playback buffer, i.e. a buffer for which the buffer size is adjustable. The buffer size is understood as the target buffer size, i.e. how much video packets would reside in the playback buffer under ideal circumstances. In reality, the amount of buffered packets in the buffer will however fluctuate due to different possible non-idealities such as fluctuations in network conditions, fluctuations in video packet size and fluctuations in the network stack of the media player. By the measurement of the arrival times at the playback buffer, a measure of all these fluctuations is obtained. Based on the measured time fluctuations, the target buffer size is adapted accordingly. This way, the target buffer size may be decreased under better conditions and thereby decrease the showtime delay. The other way around, the target buffer size may be increased under worse conditions thereby increasing the showtime delay but decreasing the probability of a buffer underrun.

According to a further embodiment, the adjusting of the target buffer size is performed such that a depletion of the playback buffer caused by the time fluctuations is below a certain probability.

The measurement of time fluctuations provides a statistical measure of how much the buffer would be depleted in the future if the arrival time fluctuations would continue as measured. As such, a probability can be assigned to the depletion of the buffer based on the measured fluctuations. As a result, a trade-off can be made between the showtime delay and the robustness of the video playback.

The adjusting of the target buffer size may be performed by decreasing the playback speed of the live stream temporarily when increasing the target buffer size until the target buffer size is reached, and by increasing the playback speed of the live stream temporarily when decreasing the target buffer size until the target buffer size is reached. This way the adapting is performed in a smooth way without affecting the viewing experience.

According to an example embodiment, the adjusting further comprises determining the target buffer size based on statistical processing of the measured time fluctuations, for example based on a histogram of the time fluctuations.

Such a histogram represents the density of the fluctuations in time. By the histogram, a certain probability for buffer depletion can be related to a maximum time fluctuation from which the target buffer sized can be derived.

According to an example embodiment, the method further comprises the following steps, upon start-up of the live stream:

> identifying an earlier video packet in the live stream;
> retrieving video packets of the live stream from the earlier packet onwards first at a network rate higher than a packet rate of the live stream, and then at the packet rate of the live stream;
> starting playback with the earlier video packet at the latest when starting the retrieval of the video packets at the packet rate;
> buffering excess video packets during the retrieval at the network rate thereby reaching the target buffer size (610) when (662, 648) starting the retrieval of the video packets at the packet rate.

Upon start-up of the live stream, the buffer is first filled with video packets before starting the actual playback. According to the above steps, this is done in an efficient way that optimizes the playback delay while having a full playback buffer as fast as possible. More particular, by starting the playback before the current time in the video, the video packets up to the current time can be downloaded at the network speed which is higher than the video packet rate of the live stream itself. As a result, the playback buffer can by filled very quickly at the network rate.

The specific selection of the earlier video packet may then be done according to a trade-off determined by the selected earlier video packet, the target buffer size and the starting of the playback for the given network rate and video packet rate.

According to an example embodiment the identifying is performed according to this trade-off as follows:

> selecting the target buffer size;
> selecting the starting of the playback within an estimated time interval for filling the buffer to the target buffer size at the network rate;
> determining therefrom the earlier video packet.

In other words, when fixing the target buffer size, the playback can be started at a selected moment during the filling of the buffer which will determine the actual earlier video packet. The earlier the selected moment for playback, the earlier the video packet that is to be selected and the longer it will take to reach the target buffer size.

According to example embodiments, the identifying comprises determining a sequence number of the earlier video packet and retrieving it based on this sequence number.

According to example embodiments, the identifying comprises determining a show time of the earlier video packet and the retrieving is performed based on this show time.

The method according to any one of the preceding claims wherein a respective video packet contains a group of video frames. For example, a video packet can contain a Group of Picture, GOP, or a sub-GOP.

According to a second example aspect, the disclosure relates to a media client configured to perform the method according to the first example aspect.

According to a third example aspect, the disclosure relates to a computer program product comprising computer-executable instructions for causing an apparatus to perform at least the method according to the first example aspect.

According to a fourth example aspect, the disclosure relates to a computer readable storage medium comprising computer-executable instructions for performing the method according to the first example aspect when the program is run on a computer.

BRIEF DESCRIPTION OF THE DRAWINGS

Some example embodiments will now be described with reference to the accompanying drawings.

DETAILED DESCRIPTION OF EMBODIMENT(S)

Figure 1:
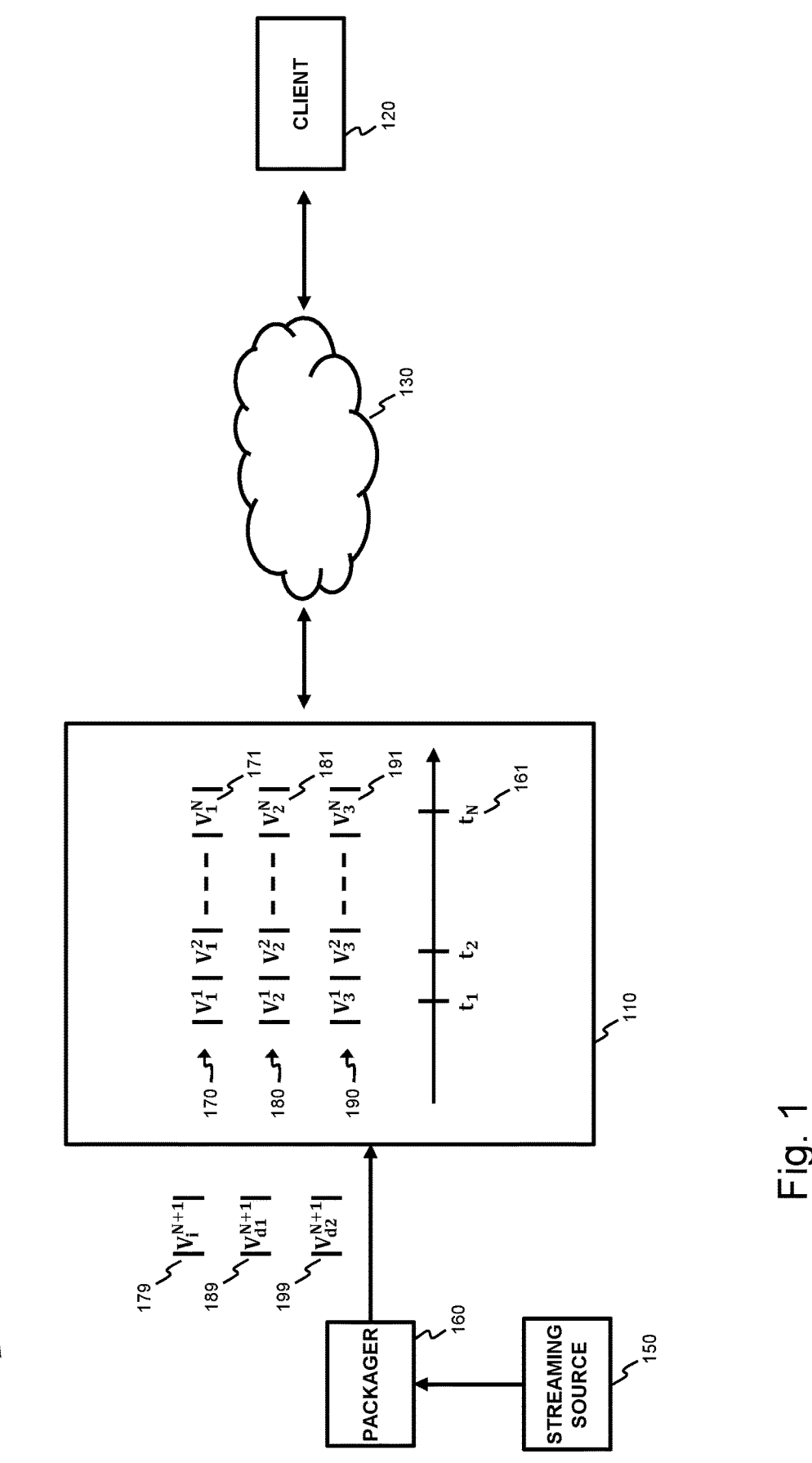
FIG. 1 shows an example embodiment of a streaming system for delivering live streaming to a client across a communication network.

FIG. 1 shows a streaming system 100 for streaming a live video stream originating from a streaming source 150 to a media client 120. Streaming system 100 comprises an origin server 110 onto which the live video stream is made available at a certain moment in time $t_1$. The live stream is available as a stream of video packets that are received and played back one after the other within the media client 120 by rendering the live stream to an end user or viewer. The live stream may be made available on the origin server 110 in different versions, e.g. versions 170, 180 and 190. A single video packet is represented in FIG. 1 as $$V_x^y$$

wherein the subscript x identifies the version and the superscript y refers to the relative position in time within the video.

A video packet $$V_x^y$$

comprises at least one video frame. Different types of video frames are known in the art depending on whether the video frames are compressed in size by using spatial image compression and temporal motion compensation. Frames on which only spatial image compression is applied or no compression is applied are referred to as temporal independent frames, key frames, independent frames or I frames. A key frame is thus a frame that is decodable independently from other frames. Frames to which temporal motion compensation is applied, either in combination with image compression, are referred to as temporal dependent frames or, shortly dependent frames. Dependent frames are thus frames for which information of other frames is needed to decompress them. Dependent frames are sometimes further categorized in P frames and B frames. P frames can use data from previous frames to be decoded and are thus more compressible than I frames. B frames can use both previous and forward frames to decode and may therefore achieve the highest amount of data compression.

Similar to frames, two types of video packets can be defined. The first type of video packet is the temporal independent video packet. Such temporal independent video packet is temporarily independent from frames in other video packets and can thus be played on its own by media client 120. An independent video packet starts with an independent frame and, optionally, has one or more subsequent dependent or independent frames. An independent video packet may also contain one single frame, i.e. a single independent frame.

The second type of video packet is the temporal dependent video packet. A dependent video packet may have a temporal dependency with another video packet. As such, a dependent video packet may contain one or more dependent frames and/or one or more independent frames. A dependent video packet may also contain one single dependent frame.

Different versions 170, 180, 190 may offer the video stream in different bit rates, e.g. by providing the stream in a different resolution, compression or video codec. This allows the media client 120 to select a version according to for example its processing capacity, display resolution and network bandwidth.

The video stream served from the origin server 110 is a live video stream, i.e. new video packets of a live stream become available on the origin server at a certain moment in time according to the video's frame rate which translates in a certain video packet rate. For example, as illustrated in FIG. 1, the first video packets $$V_1^1, V_2^1$$

and $$V_3^1$$

became available at time $t_1$; thereafter, at time $t_2$, subsequent video packets $$V_1^2, V_2^2$$

and $$V_3^2$$

became available. This continues until the most recent moment in time $t_N$ upon which video packets $$V_1^N, V_2^N$$

and $$V_3^N$$

become available. At that moment, the next video packets 179, 189 and 199 denoted as $$V_1^{N+1}, V_2^{N+1}$$

and $$V_3^{N+1}$$

are not yet available for download, i.e. not available for retrieval by media client 120. A live stream may originate from a live source, illustrated as streaming source 150. Such a streaming source may be obtained from a live recording, e.g. from a single camera or a live production environment. The streaming source may then provide the raw video stream to a packager 160 that produces the video packets 179, 189 and 199 as supported by the origin server 110 and hence, as made available for download by remote media clients. A live stream may also be produced from a prerecorded video wherein the stream is only made available on the origin server 101 from a certain moment in time $t_1$ onwards.

When a media client 120 starts the playback of the live video stream, it first needs to retrieve at least one independent video packet followed by either dependent or independent video packets. Different live streaming technologies or protocols are known in the art. These define different formatting and packaging of the video packets on the origin server 110 and how they can be retrieved by a media client 120.

One available streaming technology that supports live streaming is chunked or segmented streaming wherein the video packets on the origin server 110 are referred to as chunks or segments. The media client may then start playback by selecting a video packet from any version 170, 180, 190 from a certain point in time onwards. For example, client 120 may start playback from time $t_2$ by retrieving the sequence of video packets $$V_2^2, V_2^3, V_2^4$$

and so on. In order to start playback at any possible moment, each video packet is an independent video packet. Chunked or segmented streaming may offer adaptive bitrate streaming by allowing the client 120 to switch between the different versions 170, 180, 190 during playback thereby switching between bit rates, resolutions or codecs depending on the available resources. Information on the different versions and the segments is then available by means of a manifest file that is updated regularly on the origin server 110. Examples of such streaming protocols are HTTP Adaptive Streaming, HAS, protocols are MPEG-DASH published as ISO/IEC 23009-1:2012, HTTP Dynamic Streaming by Adobe, HTTP Live Streaming (HLS) by Apple and Smooth Streaming, a Microsoft IIS Media Services extension.

Another live streaming technology is disclosed in EP3515075A1 wherein the live video stream is made available in at least one independent version, e.g. version 170, that only contains independent video packets and in at least one so called dependent version, e.g. versions 180 and 190, that can also contain dependent video packets. The independent version 170 then provides a stream of independent video packets each having one or a few video frames. A dependent version 180, 190 then provides a compressed stream that can have either dependent or independent video packets. When starting a video stream the media client 120 first retrieves, by a first request, a first independent video packet from the independent version 170 to build up the image in the video player and then retrieves the subsequent video packets by a second request from an available dependent version 180, 190. To initiate the playback of a live stream with this streaming technology, the client can start the playback at the most recent independent video packet and then continue with the subsequent video packets. To identify the most recent video packets 171, 181, 191 in the live stream, a manifest file can be provided that contains information on the different versions and identifies the independent and dependent video packets.

According to an embodiment, the communication with the origin server 110 may be performed according to the Hypertext Transfer Protocol (HTTP), i.e. by the issuance of an HTTP GET request and a corresponding HTTP response. Further, a sequence of video packets may be obtained by establishing a chunked transfer encoding session with the server 110 allowing the sequence of video packets to be streamed over a single persistent connection. Support for chunked transfer encoding was introduced in HTTP/1.1. Origin server 110 may further support a request for a sequence of video packets as a byte range request wherein the requested byte range corresponds with the range of video packets starting at the location of the first video packet of the sequence. Support for byte range requests was also introduced in HTTP/1.1 and is further specified in IETF's RFC 7233 of June 2014.

Information on the availability of the live stream in both the independent and dependent version may be provided in the form of a URL to a manifest file that is available on the origin server 110, for example a manifest file following the Common Media Application Format (CMAF) for segmented media according to ISO/IEC 23000-19.

Media client 120 retrieves the video packets from origin server 110 over a communication network 130, e.g. a private network or the Internet. Streaming system 100 may further comprise one or more caching servers (not shown) located throughout the communication network 130. The combination of such caching servers and origin server 110 is also referred to as a content distribution network, CDN, wherein the caching servers are configured as transparent caching proxies. To this end, the caching proxies may correspond to HTTP caching proxies as known in the art.

Figure 2B:
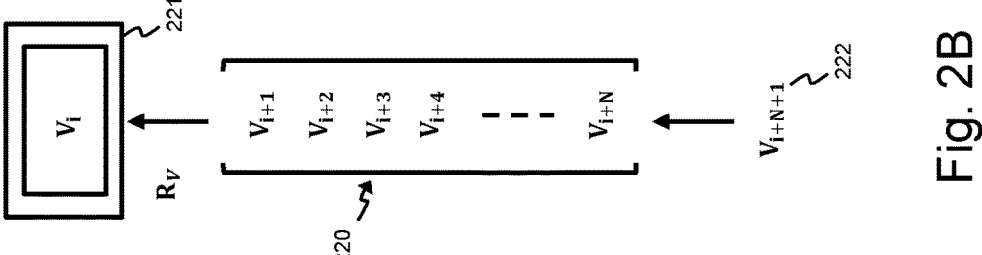
FIG. 2B illustrates a video buffer of the media client of FIG. 2A according to an example embodiment.
Figure 2A:
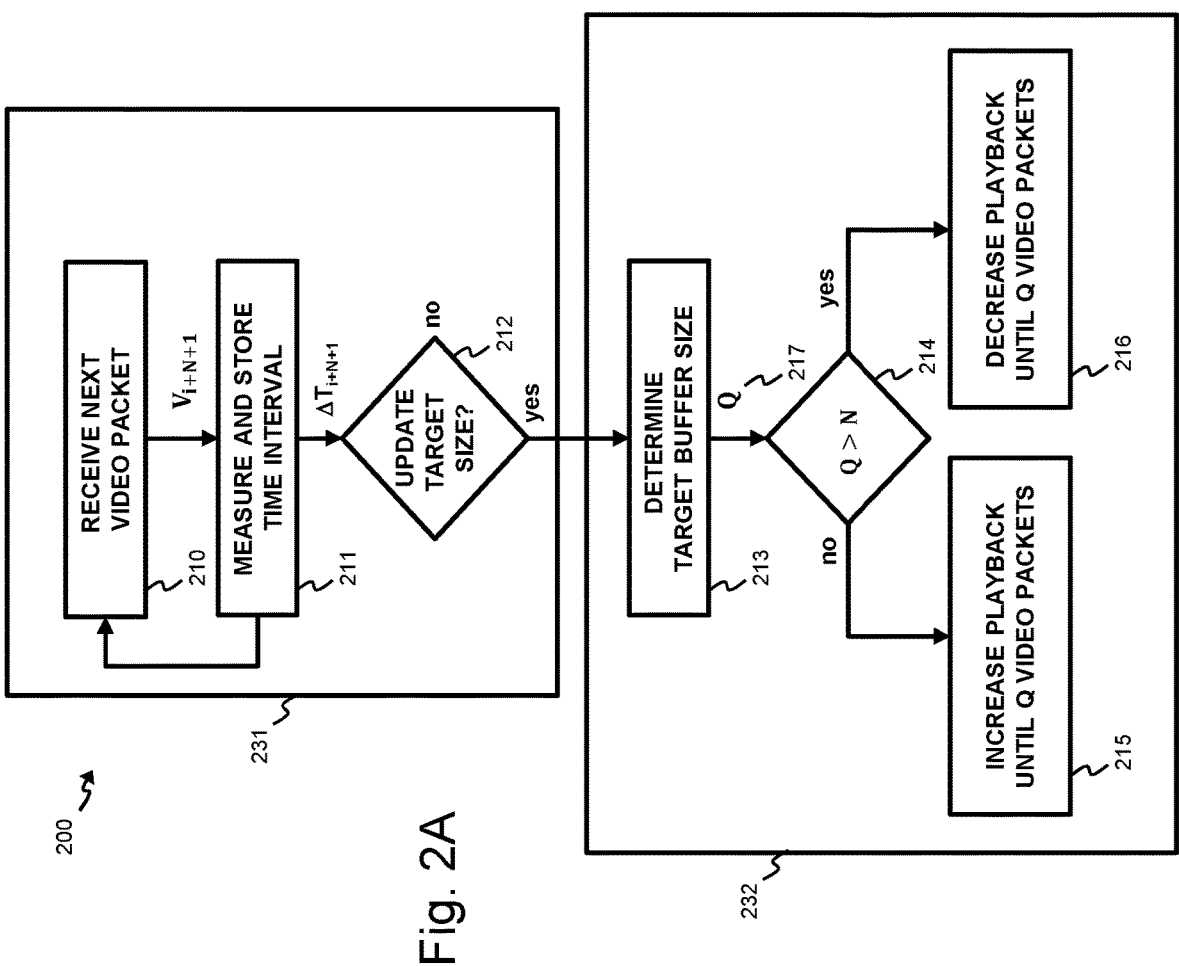
FIG. 2A shows steps performed by a media client for streaming a live stream according to an example embodiment.

FIG. 2B illustrates live streaming within a media client, e.g. media client 120, according to an example embodiment. The media client comprises a playback buffer 220 for buffering received video packets. Playback buffer 220 is configured as a first-in-first-out, FIFO, buffer wherein a most recent packet 222 is added to one side of the buffer and the oldest video packet $V_i$ is retrieved from the buffer 220 for decoding and subsequent display on a display 221 or the like. FIG. 2A shows steps 200 performed by a media client 120 during playback of a live video stream, e.g. a live stream as retrievable from streaming system 100. More particular, steps 200 illustrate the management of the target buffer size 217 of buffer 220 during playback of the live stream. The playback buffer size determines the showtime delay during playback of the live stream, i.e. the delay between the availability of the most recent video packet and the display of this video packet on the display 221. When the target buffer size is decreased, the showtime delay will decrease because less video packets are queued in the buffer 220. Similarly, when the target buffer size is increased, the showtime delay will increase because more video packets are queued in the buffer 220. Under ideal circumstances, the video packets will arrive at the media client and thus in the buffer 220 at the video packet rate $R_V$ which is determined by the frame rate $R_f$ of the video. When a video packet contains only one frame, the video packet rate is equal to the frame rate. However, due to non-idealities in the streaming system 100, fluctuations will occur in the arrival times of the video packets. Because of this, the amount of video packets in the buffer 220 will fluctuate. The purpose of the buffer 220 is to allow a smooth display of the video without interruption, i.e. without the buffer running empty of video packets which would result in a freezing of the video in the display 221. Fluctuations in the arrival time may be caused by different factors such as differences in the size of the video packets, changes or disturbances in the network bandwidth, and by the network stack of the media client 120.

Method 200 contains a first measuring or monitoring step 231 during which fluctuations in the arrival times of the received video packets are monitored. Based on these measured time fluctuations, the target buffer size is then adjusted accordingly in a further step 232. Monitoring step 231 may be performed by sub-steps 210-212. According to a first receiving step 210 a new video packet $V_{i+N+1}$ (222) is received at the buffer 220. The media client 120 then proceeds to step 211 and measures the time difference $\Delta T_{i+N+1}$ between the arrival time of the previous video packet $V_{i+N}$ and the arrival time of this new video packet $V_{i+N+1}$. Based on the measured time difference it is then determined whether the target buffer size needs to be updated according to decision step 212.

Figure 3:
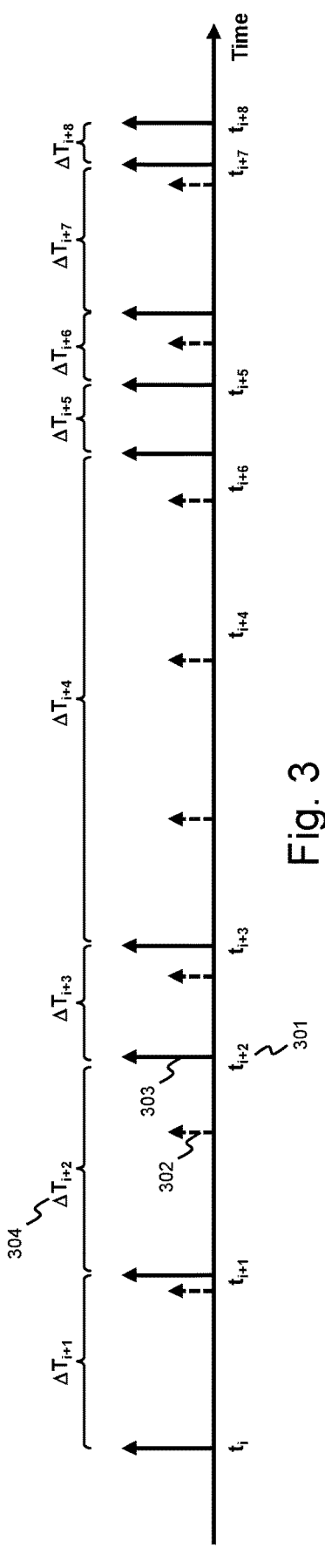
FIG. 3 shows a sequence of video packet arrival times in a media client according to an example embodiment.

The measuring of the time differences is further illustrated in FIG. 3 wherein the dashed arrows 302 illustrate the ideal equally spaced arrival times of the video packets as determined by the video packet rate $R_V$. The solid arrows 303 illustrate the actual times at which the video packets arrive at the buffer 220. Each time a video packet 303 arrives, e.g. at time $t_{i+2}$, the time 304 lapsed since the arrival of the previous packet is measured, i.e. $\Delta T_{i+2} = t_{i+2} - t_{i+1}$. Media client 120 keeps track of these measured time intervals 304 and then decides to either update the target buffer size or not.

This updating may be performed periodically, e.g. every so much seconds or minutes. In addition or alternatively, this updating may also be performed when an observable change occurs in the tracked time intervals, e.g. when the average time interval increases or decreases.

When media client 120 decides to update the target buffer size according to step 231, it proceeds to step 232. First, according to step 213 media client 120 determines the new target buffer size 217 of buffer 220 and then applies this updated buffer size 217 to buffer 220. When, according to step 214, the updated target buffer size 212 is larger than the current target buffer size N, then the playback of the live stream is slowed down, i.e. video packets are retrieved at a lower rate than the video packet rate $R_V$ from the buffer 220 for decoding and playback. When, according to step 214, the updated target buffer size 217 is smaller than the current target buffer size N, then the playback of the live stream is speed up, i.e. video packets are retrieved at a higher rate from the buffer 220 than the video packet rate $R_V$. This change in playback speed is maintained until the new target buffer size is achieved. Advantageously the change in playback speed is such that it is not noticeable to the viewer, e.g. in the order of 1% to 8% of the video's frame rate. During the execution of step 232, media client 120 may continue with step 231 and further measure the time intervals of newly received video packets according to steps 210 and 211.

The method 200 results in a dynamic adaptation of the target buffer size, i.e. the target buffer size is adapted during playback of the live stream. Further, the adaptation is based in the measured fluctuations 304 in the arrival time 303 of the video packets which are used as a quantitative measure of the probability for depletion of the playback buffer. In other words, by adapting the target buffer size according to the measured fluctuations 304, the chance of a buffer under-run can be decreased below a certain probability.

Figure 4:
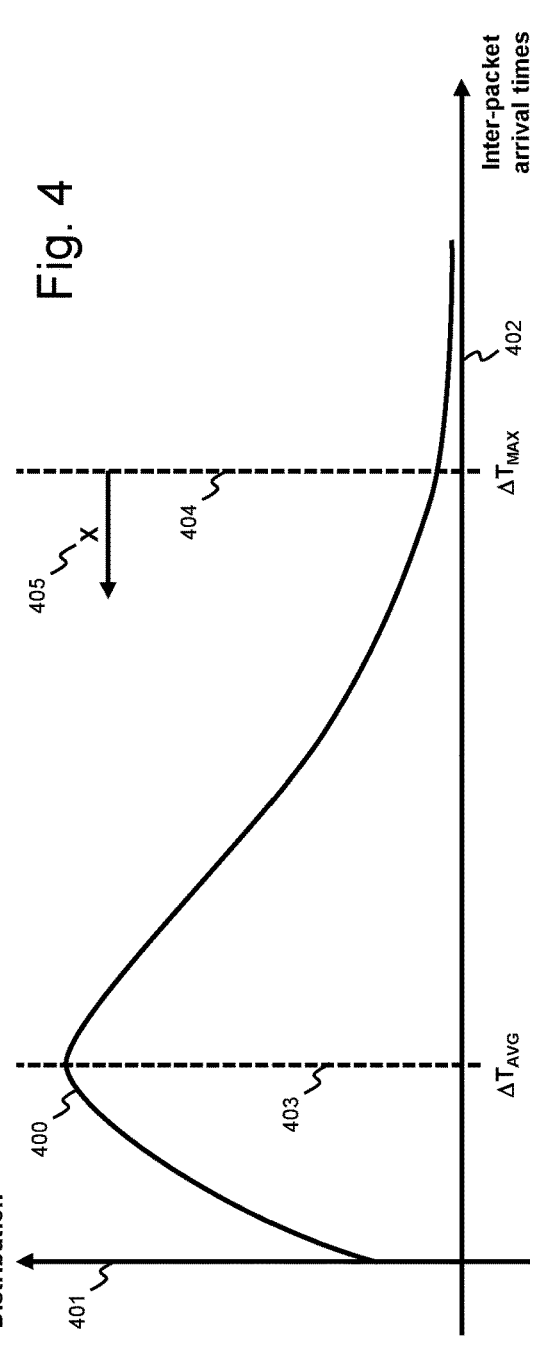
FIG. 4 shows a histogram of video packet arrival times in a media client according to an example embodiment.

According to example embodiments, the updated target buffer size is determined based on a histogram 400 of the measured time intervals as illustrated in FIG. 4. The distribution on the y-axis 401 then represents the number of times a certain inter-packet arrival time 304 as represented on the x-axis 402 was measured during step 211. Such a histogram 400 represents a probability density function wherein for a certain time interval 404 the area under the curve 400 at the left is indicative for the probability 405 that the inter-packet arrival time will be lower than this time interval $\Delta T_{MAX}$. Time interval 403 represents the ideal inter-packet arrival time as determined by the inverse of the video packet rate. From the histogram 400, a target buffer size can be determined such that the probability for buffer depletion stays below a certain probability.

According to an example embodiment the target buffer size can be determined by normalizing the histogram to a total surface of one. In the assumption that the histogram 400 is representative for the future packet interarrival times, this normalized histogram is then an estimate of the probability density function of the inter-packet arrival times. For a target probability X 405, the corresponding inter-packet arrival time value $\Delta T_{MAX}$ is derived as the inter-packet arrival time for which the surface under the histogram at the left of $\Delta T_{MAX}$ corresponds to X 405. By setting the buffer size to at least the value $\Delta T_{MAX}$, the probability that the next packet arrives in time for playback is X.

According to a further embodiment, the calculation of the buffer size takes not only the inter-packet arrival time into account, but also the probability of subsequent large inter-arrival times. One possible way to achieve this is by calculating the histogram not only for the inter-packet arrival times, but additionally also for arrival times of groups of packets. This way the probability that the arrival time for such a group of packets stays below a given value can be determined.

Figure 5:
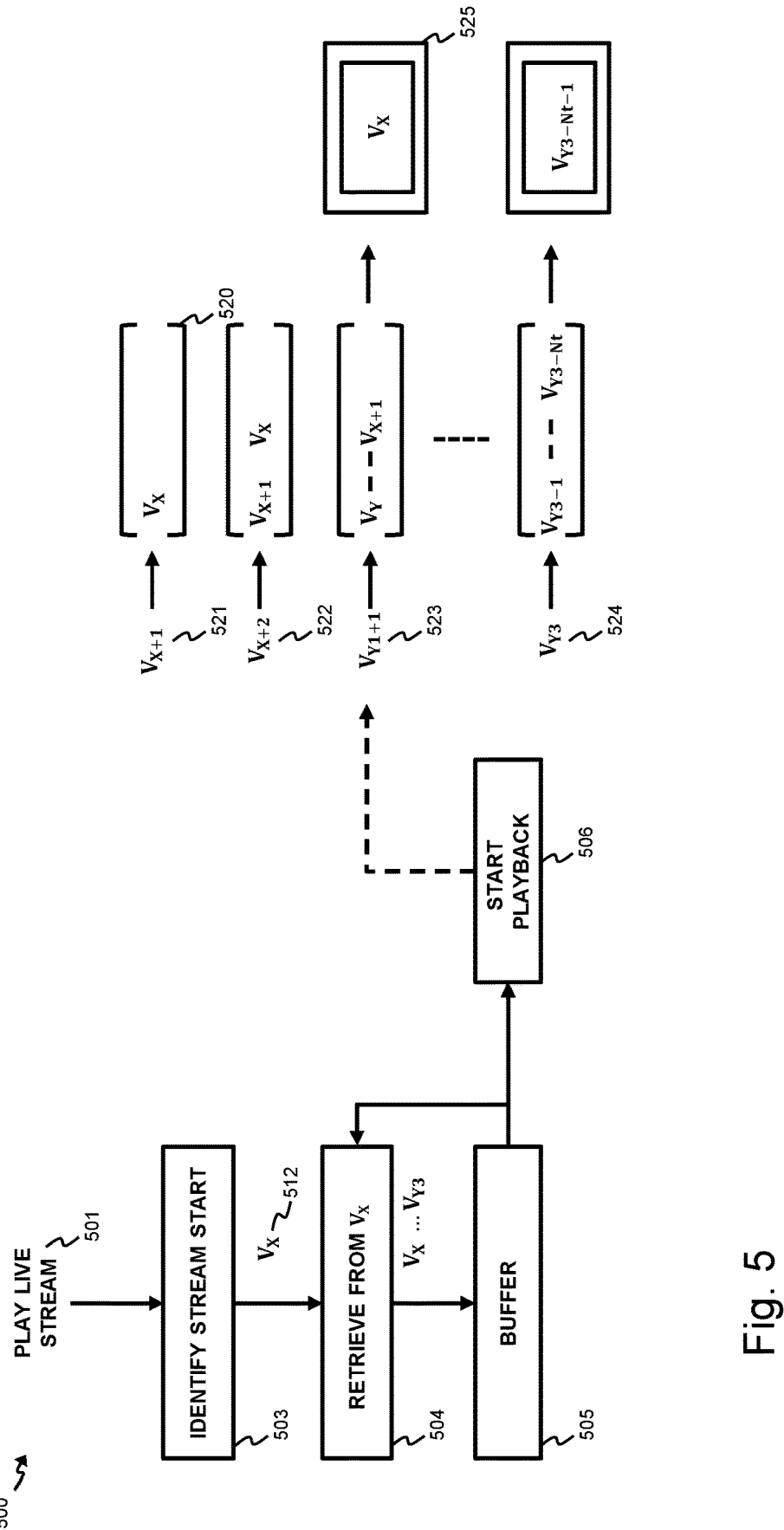
FIG. 5 shows steps performed by a media client for starting the playback of a live video stream according to an example embodiment.

FIG. 5 illustrates steps 500 executed by media client 120 according to an example embodiment. Steps 500 are executed for starting the playback of a live video stream from a streaming system 100 with a target buffer size $N_t$. FIG. 5 further illustrates the status of the buffer 520 and display 525 during different moments in time. At a certain moment in time, media client 120 receives an instruction 501 to start the playback of a live stream. Such instruction may for example be initiated by a user interaction with media player 120. The media client 120 then proceeds to step 503 wherein the start of the live stream is identified, i.e. the video packet $V_X$ (512) within the live stream from the which the media client 120 will start the retrieval of the live stream. This packet does not correspond to the most recent video packet that is available on the origin server. If the media client would start the retrieval from this most recent video packet, the video packets would be received at the video packet rate $R_V$ of the live stream and, hence, the buffer 520 would not fill up to the required target buffer size $N_t$ when displaying the live video at the video packet rate. Therefore, the media client 120 selects the stream start at an earlier video packet $V_X$ (512). Thereupon, the method 500 proceeds to step 504 and starts the retrieval of the video packets (521-524). At first, the video packets will be received faster than the video packet rate as the video packets are already available for retrieval. This first fast rate is further referred to as the network rate $R_{NW}$ and may be determined by different factors such as network bandwidth, the speed at which the origin server can provide the requested video packets and the speed of the network stack within the media client 120. When the media client 120 has reached the showtime of the live stream, i.e. has retrieved the most recent video packet, then the retrieval rate will, on average, fall back to the actual video packet rate $R_V$. When receiving a next video packet, the method 500 proceeds to step 505 and buffers the received video packet in buffer 520.

In a first phase, the received video packets 512, 521, 522 are received at the network rate and used to fill up the buffer. Then, at a certain moment in time, the media client starts playback of the live stream according to step 506. At startup, the buffer is not yet full so video packet 523 is still received at the network rate while the first received video packet 512 is decoded and displayed on display 525 at the video packet rate. As the network rate is higher than the video packet rate, the buffer will still be filled up. The buffer and thus the target buffer size will increase until the last received video packet 524 corresponds to the most recent video packet on the server 110. From then onwards, the incoming packet rate will on average be the same as the video packet rate $R_V$ and the buffer size will remain constant.

Different possibilities exist for the selection of the first video packet $V_X$ (512). The best results, as described below, are achieved when the playback of the live stream during step 506 is started at the latest when the most recent video packet 524 is received, i.e. at the latest when the video packets start arriving at the video packet rate $R_V$ instead of the network rate $R_{NW}$. From then onwards the target buffer size $N_t$ can only be adapted by changing the playback rate of the live stream as described with reference to FIG. 2. As such, for a given network rate $R_{NW}$ and packet rate $R_V$ there is a trade-off between the selection of the first video packet $V_X$ (512), the target buffer size $N_t$ and the starting of the playback, i.e. the playback delay $\tau_{PT}$ between the start of retrieving the live stream under step 504 and the start of the playback under 506.

Figure 6:
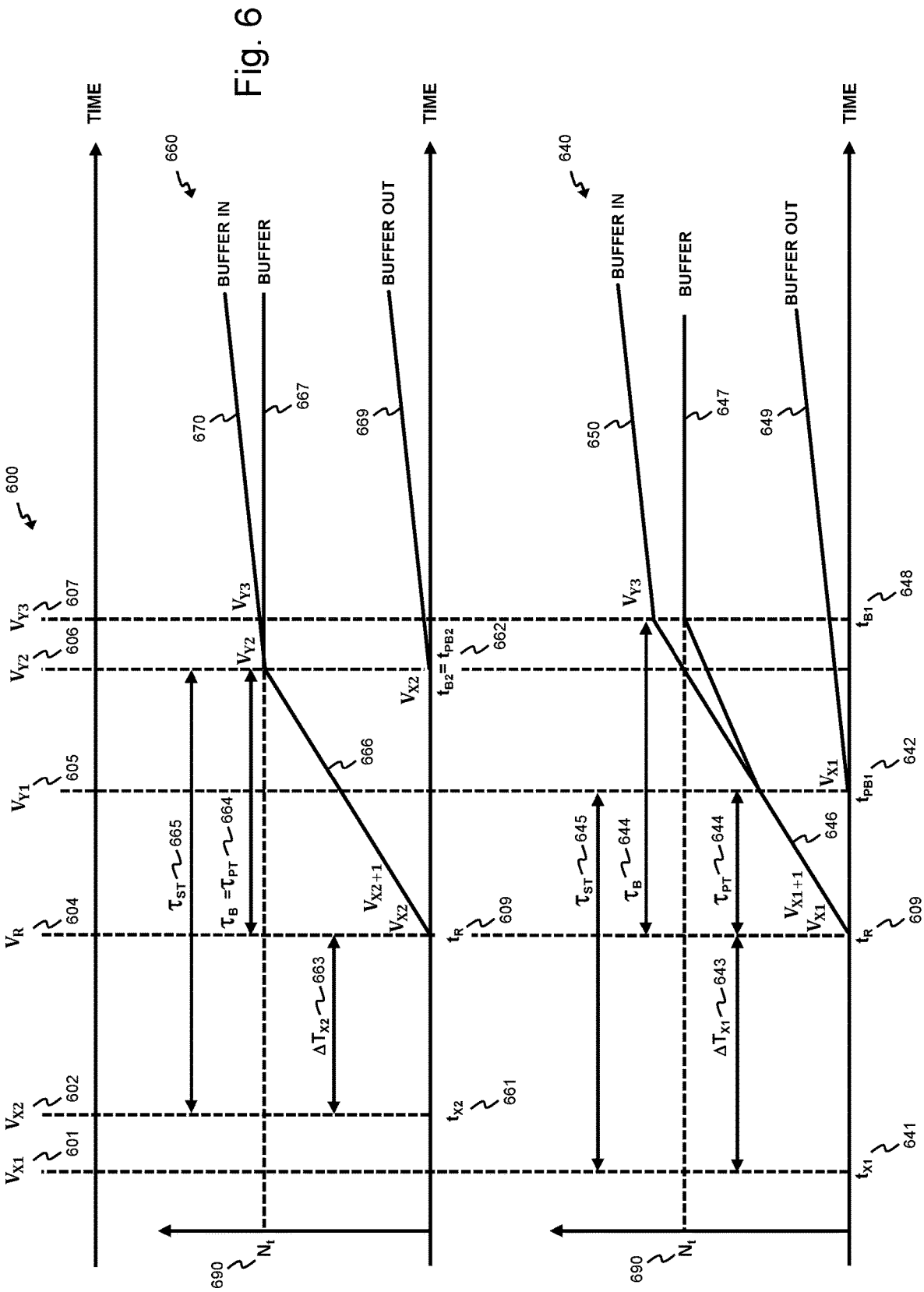
FIG. 6 shows different plots illustrating buffer occupancy in a media client according to example embodiments.

This trade-off is further described with reference to FIG. 6. In FIG. 6 three subgraphs 600, 640, en 660 are shown. The subgraphs share the horizontal time axis such that a certain moment in time can be represented by a vertical dashed line. The first subplot 600 shows the availability of video packets 601-607 of a live stream on an the server 110, e.g. at time 641 video packet 601 is the most recent video packet in the live stream that can be retrieved by the media client, at time 661 video packet 602 becomes available and so on. Subplot 660 illustrates a first scenario wherein the media player starts the retrieval of the live stream under step 504 at retrieval time $t_R$ (609). The target buffer size is indicated as $N_t$ (690) on the y-axis. Further, under this first scenario 660, the buffer is to be filled as fast as possible to this target buffer size 690. In order to do so, the media player 120 determines according to step 503 to start the retrieval with video packet $V_{X2}$ (602) which became available earlier at time $t_{X2}$ (661), i.e. a time offset $\Delta T_{X2}$ (663) before the retrieval time $t_R$ and thus the current show time. The video packets are then retrieved and added to the buffer at the maximum rate as determined by the network rate $R_{NW}$. This fast retrieval is shown by solid line 666. This line 666 represents both the total amount of video packets that reside in the buffer (BUFFER) as well as the total amount of video packets that entered the buffer (BUFFER IN) because playback has not yet started. The slope of the line 666 is thereby determined by the network rate $R_{NW}$. The filling of the buffer continues till the moment 662 wherein $t_{B2}$ indicates the time at which the buffer has reached the target buffer size of $N_t$ video packets. Given a certain predetermined target buffer size $N_t$, the network rate and the video packet rate, the first video packet 602 can be selected such that at the time 662, the then received video packet $V_{Y2}$ (606) corresponds to the most recent video packet 606 on the server. From time 662 onwards, the incoming video packet rate will therefor decrease, on average, to the video packet rate as illustrated by line 670 (BUFFER IN) wherein the slope is determined by the video packet rate. Also at time 662, playback of the live video stream is started according to step 506. In the scenario illustrated in subplot 660 the starting of the playback, i.e. the playback time $t_{PB2}$, equals the time that the buffer is filled to its target buffer time, i.e. $t_{B2}$. As a result, the playback delay $\tau_{PT}$ (664) equal the delay $\tau_B$ (664) for filling the buffer. The resulting showtime delay $\tau_{ST}$ (665) is then the sum of $\Delta T_{X2}$ (663) and $\tau_{PT}$. From this time 662 onwards video packets are thus both entering (BUFFER IN 670) and leaving (BUFFER OUT 669) the buffer on average at the video packet rate.

Subplot 640 illustrates a second scenario wherein the media player 120 again starts the retrieval of the live stream at retrieval time $t_R$ (609). The target buffer size is again indicated as $N_t$ (690) on the y-axis. Further, under this second scenario 640, the playback is to started faster then in the first scenario, i.e. at time $t_{PB1}$ (642) which results in a shorter playback delay $\tau_{PT}$ (644). In order to do so, the media player 120 determines according to step 503 to start the retrieval with video packet $V_{X1}$ (601) which became available earlier at time $t_{X1}$ (641), i.e. a time interval $\Delta T_{X1}$ (643) before the retrieval time $t_R$ and thus the current show time. The video packets are then retrieved and added to the buffer at the maximum rate, i.e. at the network rate $R_{NW}$. This fast retrieval is shown by solid line 646. This line 646 represents both the total amount of video packets that reside in the buffer (BUFFER) as well as the total amount of video packets that entered the buffer (BUFFER IN) because playback has not yet started. The slope of the line 646 is thereby determined by the network rate and thus similar to the slope of line 666. The filling of the buffer at the network rate continues till time $t_{PB1}$ (642) upon which the playback of the live stream is started with buffered video packet $V_{X1}$ (601). From this moment 642 onwards, the video packets leave the buffer at the video packet rate (BUFFER OUT 649) and still enter the buffer at the faster network rate (BUFFER IN 646). As a result, the buffer size (647) still increases but at a slower rate. This increase in buffer size continues until the moment $t_{B1}$ (648) when the media client 120 retrieves the most recent video packet 607 This moment $t_{B1}$ (648) defines the buffer delay $\tau_B$ (644). From then onwards, the video packets will enter the buffer on average at the video packet rate and the buffer size reaches the target buffer size $N_t$. The difference with the first scenario 660 is that the playback of the live stream can start earlier, i.e. there is shorter playback delay $\tau_{PT}$ (644), but that it will take longer to fill up the buffer to the target buffer size $N_t$, i.e. there is a longer buffer delay $\tau_B$ (644). More general, by selecting the correct earlier video packet at start-up a playback time $t_{PB}$ can be selected between the time $t_{B2}$ and the request time $t_R$ for a given target buffer size $N_t$.

Figure 7:
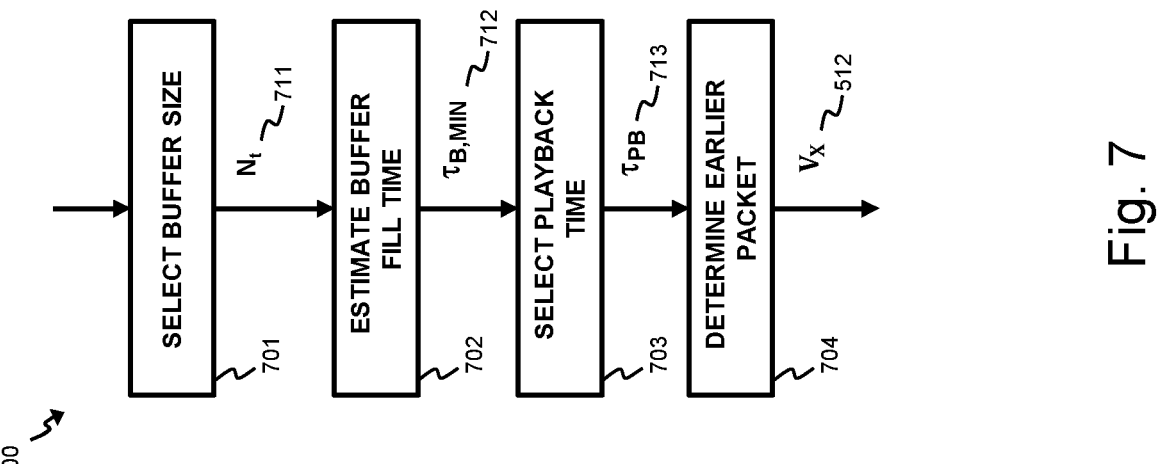
FIG. 7 shows steps performed by a media client for determining a starting video packet for starting a live video stream according to an example embodiment.

FIG. 7 illustrates steps 700 for determining the earlier video packet 512 in a live stream according to an example embodiment. According to example embodiments, steps 700 are executed as part of the above described identification step 503. As described above, there is a trade-off between the selection of the first video packet 512, the target buffer size $N_t$ and the starting of the playback for the given network rate $R_{NW}$ and video packet rate $R_V$. According to the method of FIG. 7, in a first step 701 the target buffer size 711 is selected, i.e. how much video packets would reside in the playback buffer under perfect network conditions. According to the next step 702, based on the known average network rate $R_{NW}$ and the average size $S_V$ of a video packet, the shortest time $\tau_{B,MIN}$ (712) to fill up the buffer to the target buffer size $N_t$ is determined as $$\tau_{B,MIN} = \frac{N_t \cdot S_v}{R_{NW}} = \frac{N_t}{R_{NW,V}} \qquad \text{(Eq. 1)}$$

wherein $R_{NW,V}$ is the network rate in average video packets per seconds. This time $\tau_{B,MIN}$ (712) corresponds to the scenario of subplot 660 as described above. $\tau_{B,MIN}$ thus also determines the maximum delay for starting the playback of the live stream. Then, the playback delay $\tau_{PT}$ (713) is selected in next step 703. $\tau_{PT}$ (713) can be selected from a range from zero, i.e. when the playback starts immediately, to $\tau_{B,MIN}$, i.e. where the playback starts when the buffer is filled completely to the target buffer size $N_t$. From the selected playback delay, the start video packet $V_X$ (512) is selected. The client may then retrieve the live stream from this packet onwards as described with reference to FIG. 5.

According to an example embodiment, the identification of the start video packet $V_X$ (512) from the playback delay $\tau_{PT}$ (713) may be done by combining two conditions that can be derived from subplot 640 of FIG. 6. First, the total number of packets that have entered the buffer (BUFFER IN) correspond to the sum of the buffer size (BUFFER) and the number of video packets that have left the buffer (BUFFER OUT):

US 12,652,420 B2

13                                                                    14

BUFFER IN = BUFFER + BUFFER OUT        (Eq. 2)

As a consequence, at the time $t_{B1}$ (648), i.e. when the buffer
reaches its target size $N_t$, Eq. 2 can be written as:

$$\tau_B \cdot R_{NW,V} = N_t + R_V(\tau_B - \tau_{PB})\qquad(Eq.\ 3)$$

Second, the amount of video packets retrieved at the net-
work rate corresponds to the amount of video packets made
available on the origin server from time $t_X$ (641) till $t_B$ (648).
In other words:

$$\tau_B \cdot R_{NW,V} = (\tau_B + \Delta T_X) \cdot R_V\qquad(Eq.\ 4)$$

Wherein $\Delta T_X$ is defined as the time offset 643 from the
request time $t_R$ (609) to the time $t_X$ on which starting packet
$V_X$ became available. Combining Eq. 3 and Eq. 4 then gives:

$$N_t + R_V(\tau_B - \tau_{PB}) = (\tau_B + \Delta T_X) \cdot R_V\qquad(Eq.\ 5)$$

and thus:

$$\Delta T_X = \frac{N_t + R_V \cdot \tau_{PB}}{R_V}\qquad(Eq.\ 6)$$

By this time offset $\Delta T_X$, media client 120 then identifies and
retrieves corresponding video packet $V_X$ according to steps
503 and 504.

Figure 8:
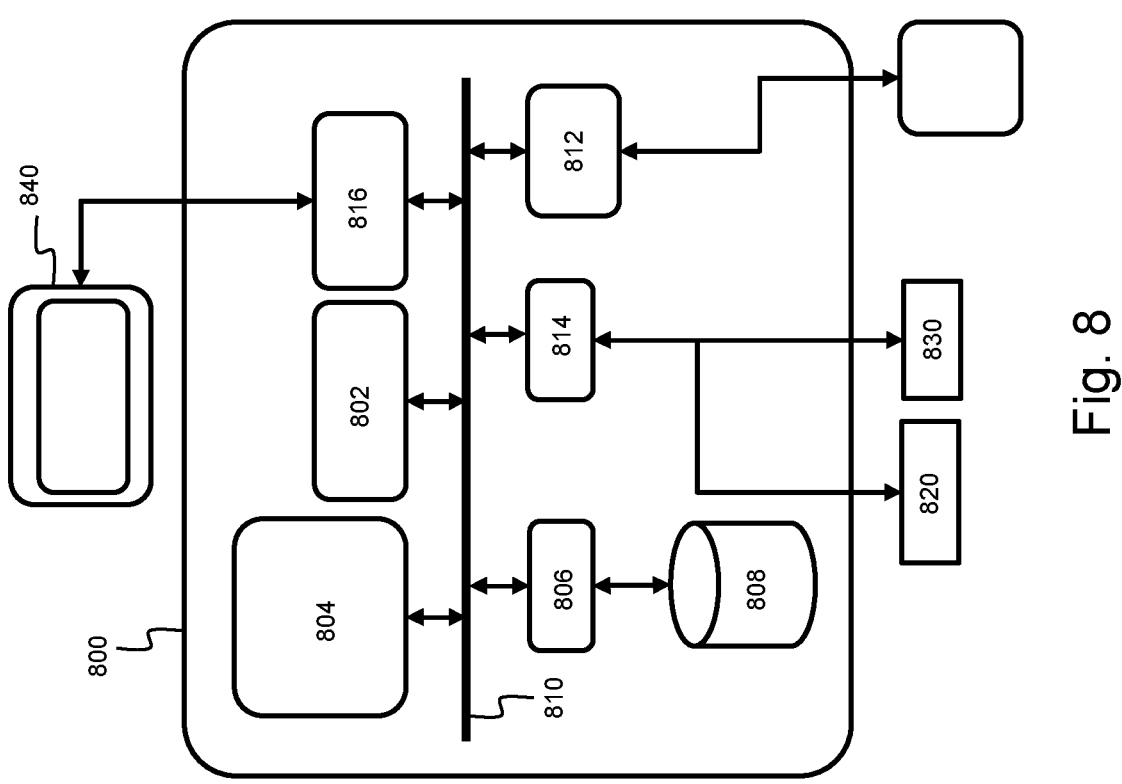
FIG. 8 shows an example embodiment of a suitable computing system for performing one or several steps in embodiments of the invention.

FIG. 8 shows a suitable computing system 800 enabling
to implement embodiments of the various described meth-
ods. More particular, computing system 800 may be con-
figured to execute steps 200, 500 and 700. To this respect,
computing system 800 may be configured to operate as
media client 120 according to the above described embodi-
ments. Computing system 800 may in general be formed as
a suitable general-purpose computer and comprise a bus
810, a processor 802, a local memory 804, one or more
optional input interfaces 814, one or more optional output
interfaces 816, a communication interface 812, a storage
element interface 806, and one or more storage elements
808. Bus 810 may comprise one or more conductors that
permit communication among the components of the com-
puting system 800. Processor 802 may include any type of
conventional processor or microprocessor that interprets and
executes programming instructions. Local memory 804 may
include a random-access memory (RAM) or another type of
dynamic storage device that stores information and instruc-
tions for execution by processor 802 and/or a read only
memory (ROM) or another type of static storage device that
stores static information and instructions for use by proces-
sor 802. Input interface 814 may comprise one or more
conventional mechanisms that permit an operator or user to
input information to the computing device 800, such as a
keyboard 820, a mouse 830, a pen, voice recognition and/or
biometric mechanisms, a camera, etc. Output interface 816
may comprise one or more conventional mechanisms that
output information to the operator or user, such as a display
840, etc. Communication interface 812 may comprise any transceiver-like mechanism such as for example one or more
Ethernet interfaces that enables computing system 800 to
communicate with other devices and/or systems, for
example with the Internet 130 and origin server 110. The
communication interface 812 of computing system 800 may
be connected to such another computing system by means of
a local area network (LAN) or a wide area network (WAN)
such as for example the internet. Storage element interface
806 may comprise a storage interface such as for example a
Serial Advanced Technology Attachment (SATA) interface
or a Small Computer System Interface (SCSI) for connect-
ing bus 810 to one or more storage elements 808, such as one
or more local disks, for example SATA disk drives, and
control the reading and writing of data to and/or from these
storage elements 808. Although the storage element(s) 808
above is/are described as a local disk, in general any other
suitable computer-readable media such as a removable mag-
netic disk, optical storage media such as a CD or DVD,
-ROM disk, solid state drives, flash memory cards, . . . could
be used.

As used in this application, the term "circuitry" may refer
to one or more or all of the following:
(a) hardware-only circuit implementations such as imple-
mentations in only analog and/or digital circuitry and
(b) combinations of hardware circuits and software, such
as (as applicable):
(i) a combination of analog and/or digital hardware
circuit(s) with software/firmware and
(ii) any portions of hardware processor(s) with software
(including digital signal processor(s)), software, and
memory(ies) that work together to cause an appara-
tus, such as a mobile phone or server, to perform
various functions) and
(c) hardware circuit(s) and/or processor(s), such as micro-
processor(s) or a portion of a microprocessor(s), that
requires software (e.g. firmware) for operation, but the
software may not be present when it is not needed for
operation.

This definition of circuitry applies to all uses of this term
in this application, including in any claims. As a further
example, as used in this application, the term circuitry also
covers an implementation of merely a hardware circuit or
processor (or multiple processors) or portion of a hardware
circuit or processor and its (or their) accompanying software
and/or firmware. The term circuitry also covers, for example
and if applicable to the particular claim element, a baseband
integrated circuit or processor integrated circuit for a mobile
device or a similar integrated circuit in a server, a cellular
network device, or other computing or network device.

Although the present invention has been illustrated by
reference to specific embodiments, it will be apparent to
those skilled in the art that the invention is not limited to the
details of the foregoing illustrative embodiments, and that
the present invention may be embodied with various
changes and modifications without departing from the scope
thereof. The present embodiments are therefore to be con-
sidered in all respects as illustrative and not restrictive, the
scope of the invention being indicated by the appended
claims rather than by the foregoing description, and all
changes which come within the scope of the claims are
therefore intended to be embraced therein.

It will furthermore be understood by the reader of this
patent application that the words "comprising" or "com-
prise" do not exclude other elements or steps, that the words
"a" or "an" do not exclude a plurality, and that a single
element, such as a computer system, a processor, or another
integrated unit may fulfil the functions of several means recited in the claims. Any reference signs in the claims shall not be construed as limiting the respective claims concerned. The terms "first", "second", third", "a", "b", "c", and the like, when used in the description or in the claims are introduced to distinguish between similar elements or steps and are not necessarily describing a sequential or chronological order. Similarly, the terms "top", "bottom", "over", "under", and the like are introduced for descriptive purposes and not necessarily to denote relative positions. It is to be understood that the terms so used are interchangeable under appropriate circumstances and embodiments of the invention are capable of operating according to the present invention in other sequences, or in orientations different from the one(s) described or illustrated above.

The invention claimed is:

1. A method for playing a live stream in a media player, the media player comprising a playback buffer for buffering received video packets according to a target buffer size, the method comprising:

measuring time fluctuations in arrival time of the received video packets in the playback buffer; and adjusting the target buffer size based on the measured time fluctuations, wherein the adjusting the target buffer size is performed such that a depletion of the playback buffer caused by the time fluctuations is below a certain probability.

2. The method according to claim 1, wherein the adjusting further comprises:

decreasing playback speed of the live stream temporarily when increasing the target buffer size until the target buffer size is reached; and increasing playback speed of the live stream temporarily when decreasing the target buffer size until the target buffer size is reached.

3. The method according to claim 1, wherein the adjusting comprises determining the target buffer size based on statistical processing of the measured time fluctuations.

4. The method according to claim 1 further comprising, upon start-up of the live stream in the media player:

identifying an earlier video packet in the live stream;

retrieving video packets of the live stream from the earlier packet onwards, wherein the retrieving is first at a network rate higher than a packet rate of the live stream, and then at the packet rate of the live stream;

starting playback with the earlier video packet, wherein the playback starts when starting the retrieval of the video packets at the packet rate; and buffering excess video packets during the retrieval at the network rate thereby reaching the target buffer size when starting the retrieval of the video packets at the packet rate.

5. The method according to claim 4, wherein the identifying the earlier video packet comprises selecting the earlier video packet according to a trade-off between the selected earlier video packet, the target buffer size and the starting of the playback for the network rate and the packet rate.

6. The method according to claim 4, wherein the identifying comprises:

selecting the target buffer size;

estimating a time interval for filling the buffer to the target buffer size at the network rate;

selecting the starting time of the playback within the estimated time interval; and determining the earlier video packet based on the selected starting time.

7. The method according to claim 4, wherein the identifying comprises determining a sequence number of the earlier video packet, and the retrieving is performed based on the sequence number.

8. The method according to claim 4, wherein the identifying comprises determining a show time of the earlier video packet, and the retrieving is performed based on the show time.

9. The method according to claim 1, wherein a respective video packet contains a group of frames.

10. A media client comprising a playback buffer for buffering received video packets according to a target buffer size, wherein the media client is configured to play a live stream by performing operations comprising:

measuring time fluctuations in arrival time of the received video packets in the playback buffer, and adjusting the target buffer size based on the measured time fluctuations, wherein the adjusting the target buffer size is performed such that a depletion of the playback buffer caused by the time fluctuations is below a certain probability.

11. A non-transitory computer readable storage medium comprising computer-executable instructions executable by a computer to perform operations for playing a live stream on a media player, the media player comprising a payback buffer for buffering received video packets according to a target buffer size, the operations comprising:

measuring time fluctuations in arrival time of the received video packets in the playback buffer; and adjusting the target buffer size based on the measured time fluctuations, wherein the adjusting the target buffer size is performed such that a depletion of the playback buffer caused by the time fluctuations is below a certain probability.

12. The method of claim 1, wherein measuring the time fluctuations comprises determining respective time differences between arrival times of respective consecutive video packets.

* * * * *